United States Patent [19]

Eddy et al.

[11] 3,959,573

[45] May 25, 1976

[54] BIASABLE MEMBER AND METHOD FOR MAKING

[75] Inventors: Clifford O. Eddy, Webster; James A. Lentz, Penfield; Stephen Strella, Pittsford, all of N.Y.

[73] Assignee: Xerox Corporation, Stamford, Conn.

[22] Filed: Apr. 26, 1974

[21] Appl. No.: 464,397

[52] U.S. Cl............................ 428/425; 29/132; 346/74 ES; 355/3 R; 427/24; 427/58; 428/36
[51] Int. Cl.².................. G03G 15/00; G03G 13/00
[58] Field of Search...... 96/1.4; 117/132 B, 161 KP, 117/94, 201, 218; 29/132; 346/74 ES; 355/3 R, 3 TR; 427/24, 58; 118/621, 637; 101/DIG. 13; 428/425, 36

[56] References Cited
UNITED STATES PATENTS

| | | | |
|---|---|---|---|
| 3,293,728 | 12/1966 | Hill | 117/161 KP X |
| 3,459,712 | 8/1969 | Butler | 117/161 KP X |
| 3,697,171 | 10/1972 | Sullivan | 96/1.4 X |
| 3,702,482 | 11/1972 | Dolcimascolo et al. | 101/DIG. 13 X |
| 3,832,055 | 8/1974 | Hamaker | 96/1.4 X |
| 3,837,741 | 9/1974 | Spencer | 96/1.4 X |
| 3,863,603 | 2/1975 | Buckley et al. | 118/637 |

*Primary Examiner*—Ralph Husack
*Attorney, Agent, or Firm*—James J. Ralabate; Donald C. Kolasch; Ernest F. Chapman

[57] ABSTRACT

Rolls, belts and other biasable members having minimal sensitivity to relative humidity changes are described. Biasable members having at least one layer or coating of a hydrophobic elastomeric polyurethane change little in resistivity when changes in relative humidity occur. The utility of such biasable members is in the transfer of xerographic images from a photoconductor to a final support sheet where the member, for example, a bias transfer roll, electrically cooperates with a photoconductor to establish a directional force field therebetween.

27 Claims, 2 Drawing Figures

BIASABLE MEMBER AND METHOD FOR MAKING

BACKGROUND OF THE INVENTION

This invention relates to xerography and, more particularly, relates to compositions and methods for making bias transfer rolls and belts for transferring xerographic toner images from one support surface to another.

In conventional xerography a photosensitive plate, which consists of a photoconductive coating placed over a conductive backing, is charged uniformly and the charge plate is then exposed to a light image of an original. Under the influence of the light image the charge on the plate is selectively dissipated to record the original input information on the plate in the form of a latent electrostatic image. The latent image is developed, or made visible, by applying oppositely charged toner particles to the plate surface in a manner so that the toner particles are attracted into the imaged areas. The developed images are generally transferred from the photoconductor to a final support material, such as paper or the like, and affixed thereto a form a permanent record of the original.

Image transfer from the photoconductor to the final support material may be accomplished by means of a corona induction using a corona generator, or it may be accomplished by a roller or belt electrode biased to a certain potential, such electrode being referred to as a bias transfer member (roll or belt). The corotron system is relatively simple, but the charges deposited by the corotron electrostatically tack the final support material, such as paper, to the original toner support, such as, the photoconductor, in addition to creating the desired electric field affecting transfer of the toner to the paper. The strong attraction between the paper and the original toner support makes it mechanically difficult to separate or detack the two supports.

Transfer of developed images from the photoconductor to the final support material with the aid of a biased transfer member is now well known in the art, and such a member generally avoids severe tacking problems which are encountered when the corona induction system is utilized. Bias transfer members are well known in the art. A bias transfer roll is disclosed by Fitch in U.S. Pat. No. 2,807,233 where a metal roll coated with a resilient coating having a resistivity of about $10^6$ to $10^8$ ohm cm is used as a bias transfer member. Shelffo in U.S. Pat. No. 3,520,604 suggests that in order to create the proper environment for the duplicating mode, a transfer roll is used and is made of a conductive rubber having a resistivity in the range of from about $10^{11}$ to about $10^{16}$ ohm cm. A bias transfer member, that is, a member for electrically cooperating with a conductive support surface to attract electrically charged particles from the support surface towards the member, is described by Dolcimascolo et al in U.S. Pat. No. 3,702,482. In Dolcimascolo et al, the bias transfer member has a conductive substrate for supporting a bias potential thereon, an intermediate blanket placed in contact with the substrate having an electrical resistivity capable of readily transmitting the bias potential on the substrate to the outer periphery of the blanket and a relatively thin outer coating placed over the blanket having an electrical resistivity to minimize ionization of the atmosphere when the transferred member is placed in electrical cooperation with the image support surface and provides a good toner release property enabling the device to be cleaned of the toner. A typical material for the relatively thin outer coating in accordance with Dolcimascolo et al, is one formulated of a material capable of providing a relatively smooth surface exhibiting relatively good mechanical release properties in respect to the toner materials employed. One such material is a polyurethane material manufactured by the DuPont Company under the tradename "Adiprene".

The intermediate blanket of Dolcimascolo et al, also known as the relaxable layer, is preferably formed of a polyurethane rubber about 0.25 inch in thickness having sufficient resiliency to allow the roll to deform when brought into moving contact with the photoconductive drum surface to provide an extended contact region in which the toner particles can be transferred between the contacting bodies. However, the above-described biasable or bias transfer members are sensitive to changes in relative humidity. The heart of the bias transfer member is the thick resilient blanket or relaxable layer having a bulk resistivity falling in a well-defined operating range selected in relation to roll diameter and surface velocity. For these prior art systems the bulk resistivity of the blanket can vary over the range from about $10^8$ to about $10^{11}$ ohm cm. A variation in this resistivity of about two orders of magnitude, primarily as a result of static and dynamic changes in relative humidity, RH, (extending generally from 5 to 10 percent RH to 85 to 100 percent RH), is observed for the practical available commercial materials in this resistivity range. This variation in resistivity due to relative humidity effects the quality of image transferred from the photoconductor to the final support material. Optimum voltage varies strongly with relative humidity. Washed-out images characteristic of low transfer fields occur at high humidity due to the increased flow of current from the core to the photoreceptor in areas outside the paper path.

OBJECTS OF THE INVENTION

Accordingly, it is an object of this invention to improve biasable transfer members used for electrically transferring a toner image from a photoconductive surface to a final support sheet.

It is another object of this invention to provide compositions and methods for making biasable transfer members wherein the resistivity of the biasable member is relatively independent of variations in relative humidity.

A further object of this invention is to provide a bias transfer roll having a resilient elastomeric layer, the resistivity of which is substantially insensitive to relative humidity.

SUMMARY OF THE INVENTION

These and other objects of the invention are attained by means of a biasable transfer member, that is, a member capable of electrically cooperating with a conductive support surface to attract charged toner particles from the support towards the member, the member having at least one layer comprising a hydrophobic elastomeric polyurethane. Basically, the biasable transfer member of the present invention having a resistivity in which the change in resistivity is substantially insensitive to changes in relative humidity, comprises a conductive substrate for supporting a uniform bias potential thereon and at least one coating comprising a hydrophobic elastomeric polyurethane, the hydrophobic elastomeric polyurethane coating being placed over the conductive substrate. Thus, in accordance with the present invention there is provided a method of controlling the resistivity of a biasable transfer member to changes in relative humidity by coating a conductive substrate for supporting a uniform bias potential, with at least one layer of a hydrophobic elastomeric polyurethane. Optionally, the hydrophobic elastomeric polyurethane may be coated with a thin outer coating of an elastomeric material to minimize ionization of the atmosphere in and about the contact region.

By the use of the term "biasable transfer member" or "bias transfer roll" is meant a member or roll for electrically cooperating with a conductive support surface to attract electrically, charged particles from the support surface towards the member. More specifically, a bias transfer roll is one which electrically cooperates with a photoconductive plate when brought into contact therewith to attract charged toner particles from the plate in the direction of the roll. In this manner, the developed images are transferred from the photoconductor to a final support material, such as paper or the like.

By use of the term "hydrophobic polyurethane" is meant that class of polyurethanes having a chemical structure which does not form bonds or significantly interact with water, thereby referring to those polyurethanes which, due to their functionality, substantially exclude water. They are characterized by their low relative humidity swing which is their propensity to vary only from about 1 to about 12 in the ratio of the resistivity at relative humidity of 10 percent to the resistivity at relative humidity of 80 percent.

For a better understanding of the invention as well as other objects and further features thereof, reference is had to the following detailed description of the invention to be read in connection with the accompanying drawings.

DESCRIPTION OF THE PREFERRED EMBODIMENTS

The biasable transfer members of the present invention have application in any number of xerographic devices in which a transfer member, and more particularly, a bias transfer roll, is used for electrically cooperating with a photoconductive plate when brought into contact therewith to attract charged toner particles from the plate toward the roll. The utility of such a biased roll transfer mechanism is described by Dolcimascolo et al in U.S. Pat. No. 3,702,482 issued Nov. 7, 1972 and incorporated herein by reference. Therein is claimed a transfer member for electrically cooperating with a conductive support surface to electrically attract charged particles from the support surface towards the member including a conductive substrate for supporting a uniform bias potential thereon, an intermediate, resilient blanket placed in contact with said substrate having an electrical resistivity such that the blanket is capable of transmitting said bias potential on said substrate to the outer periphery of said blanket, and an outer coating placed over said blanket having an electrical resistivity to minimize ionization of the surrounding atmosphere when said transfer member is placed in electrical cooperation with said support surface. A polyurethane material manufactured by the DuPont Company under the tradename Adiprene is suggested therein as an outer coating of a roll capable of providing a relatively smooth surface and exhibiting relatively good mechanical release properties in respect to the toner materials employed, the elastomeric material being approximately 0.0025 inch in thickness and having a hardness in the 65–75 D durometer range. Over the core is placed a relatively thick intermediate blanket of elastomeric material having a hardness of between 15–25 durometers, preferably a polyurethane rubber approximately 0.25 inch in thickness.

Figure 1:
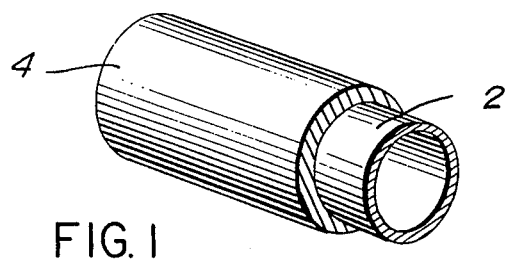
FIG. 1 is a perspective view in partial section showing the construction of a bias transfer roll having a hydrophobic elastomeric polyurethane coated upon a conductive substrate.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is a hydrophobic elastomeric polyurethane. Outer coating 4 which is formed of a resilient elastomeric material is preferably about 0.25 inch in thickness having a hardness between about 40 Shore 00 and about 40 Shore A and preferably about 10–25 durometers. Where coating 4 minimizes ionization of the atmosphere in and about the contact region of the bias transfer member with the photoconductor; where it has suitable mechanical stability; and where it is easy to clean, the hydrophobic elastomeric polyurethane may be the outermost coating on the bias transfer member. It is preferred that the resilient hydrophobic elastomeric polyurethane have a resistivity of between about $10^7$ and $5.0 \times 10^{11}$ ohm cm. In accordance with the present invention, the coating of the conductive substrate must be formulated of at least one layer of hydrophobic elastomeric polyurethane. By coating the biasable transfer member (roll) with this particular class of polyurethanes, resistivity of the biasable transfer roll is controlled in relationship to changes in relative humidity, and more specifically, resistivity remains substantially unchanged when changes in relative humidity occur. Thus, the hydrophobic elastomeric polyurethanes used as the outer coating of the bias transfer member of FIG. 1 are essentially humidity insensitive. Examples of the hydrophobic elastomeric polyurethane materials are given infra.

Figure 2:
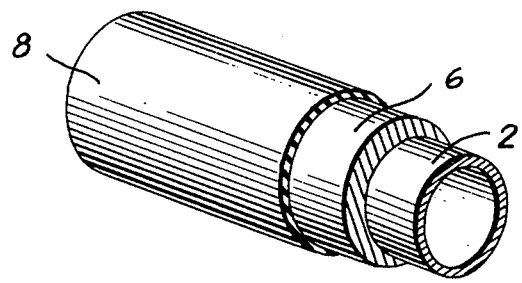
FIG. 2 is a perspective view in partial section showing the construction of a bias transfer roll having a hydrophobic elastomeric resilient blanket or relaxable layer intermediate the conductive substrate and a relatively thin outer coating.

Referring now to FIG. 2, wherein there is shown a cut-away view of a biasable transfer roll and a clear illustration of the internal construction thereof, there is shown a rigid hollow cylinder 2 that is fabricated of a conductive metal, as in FIG. 1, capable of readily responding to a biasing potential placed thereon. Over the rigid hollow cylinder 2 is placed a relatively thick resilient intermediate blanket 6 of hydrophobic elastomeric polyurethane material having a hardness of between about 40 Shore 00 and about 40 Shore A. The hydrophobic elastomeric polyurethane may be about 0.125 inch to about 0.625 inch in thickness and is preferably 0.25 inch in thickness, having sufficient resiliency to allow the roll to deform when brought into moving contact with the photoconductive drum surface to provide an extended contact region in which the toner particles can be transferred between the contact bodies. Intermediate blanket 6, which is comparable to layer 4 in FIG. 1, should be capable of responding rapidly to the biasing potential to impart electrically the charge potential on the core to the outer extremities of the roll surface. The blanket therefore should have a resistivity of between about $10^7$ and $5.0 \times 10^{11}$ ohm cm, and preferably about $10^9$ to about $10^{10}$ ohm cm. Over the intermediate hydrophobic blanket is placed a relatively thin outer coating 8 which according to the prior art bias transfer rolls, may be an elastomeric material such as a polyurethane having a resistivity of between $10^{10}$ and $10^{15}$ ohm cm and which preferably has a thickness of about 0.0025 inch and a hardness of about 65–75 D durometer. Ionization of the atmosphere in and about the contact region is minimized in accordance with the discussion set forth above relating to the resistivity of the outer coating.

The outer layer 8, known also as a self-leveling layer, is a leaky insulator, and is generally selected for its higher resistive values than those of resilient blanket (relaxable layer) 6. In addition, outer layer 8 includes materials, or is so related to relaxable layer 6, such that charges applied to the outer surface of layer 8 will be generally dissipated within one revolution of the roll. Layer 8 also acts as a thin insulating layer to help protect resilient blanket 6 during air breakdown, to limit current flow through the roll, and to make the roll surface easy to clean. When the relaxable material, i.e., the resilient, hydrophobic elastomeric polyurethane, is durable and cleanable, layer 8 is not required, and the roll of FIG. 1 may be used as a biasable transfer member. Furthermore, in accordance with the present invention, relative humidity problems are substantially reduced or eliminated, and outer layer 8 need not act as a moisture barrier to prevent resistivity changes in resilient blanket 6 due to changes in relative humidity. Thus, when the biasable transfer members of this invention are coated with at least one layer of a hydrophobic elastomeric polyurethane, the resistivity thereof is controlled even when there are substantial changes in the relative humidity.

The hydrophobic elastomeric polyurethanes of the present invention for making biasable transfer members by coating a conductive substrate for supporting a uniform bias potential thereon with at least one coating of the hydrophobic elastomeric polyurethane, are those characterized by a low resistivity ratio obtained by measuring the resistivity of the hydrophobic elastomeric polyurethane at a relative humidity of 10 percent and a relative humidity of 80 percent, The ratio of the resistivity at a relative humidity of 10 percent to the resistivity at a relative humidity at 80 percent, should be about 1 to about 12 to provide a suitable biasable transfer member in accordance with the present invention. This relative humidity swing is also referred to as the relative humidity sensitivity. In addition to the low relative humidity swing, the hydrophobic elastomeric polyurethanes useful for biasable transfer members must also have a resistivity of between about $10^7$ and $5.0 \times 10^{11}$ ohm cm. In the event the hydrophobic elastomeric polyurethane has a resistivity higher than the desired resistivity, the resistivity may be adjusted by the addition of a suitable ionic additive for reducing the resistivity of the particular polyurethane. For example, a particular hydrophobic elastomeric polyurethane may have a low RH sensitivity, but it may have a resistivity of $10^{14}$. By the use of a suitable additive, such as a quaternary ammonium compound, that resistivity may be reduced from $10^{14}$ to within the range of $10^7$ and $5.0 \times 10^{11}$ ohm cm without any adverse effect upon the RH sensitivity. Suitable ionic additives are set forth in a copending application assigned to the same assignee and filed herewith.

The elastomeric polyurethanes suitable for the manufacture of biasable transfer members which are substantially insensitive to changes in relative humidity, are those which are "hydrophobic" in nature and comprise a largely hydrocarbon structure with few polar groups to absorb water.

The preparation of urethanes depends upon the reaction of an isocyanate and an alcohol. For the formation of polymers (polyurethanes), each of the reactants must have more than one reactive group per molecule, thus the isocyanate must be a diisocyanate and the alcohol must be a dialcohol. When the diisocyanate is used in excess, —N=C=O groups are found at the ends of the polymer chains, and normally these react with the urethane groups in the polymer chain leading to crosslinking between chains and hardening of the polymer. In order to soften the hydrophobic elastomeric polyurethane, the hydroxy compound is used in excess, or softening agents or plasticizers are used in order to provide the suitable softness for the desired resiliency of the biasable transfer member.

The NCO/OH ratio is a convenient quantity used to denote whether isocyanate or hydroxyl is in excess and by how much. For equal equivalent amounts, NCO/OH equal one. For excess hydroxyl, the ratio is less than 1.

Examples of suitable hydrophobic elastomeric polyurethanes which may be used in manufacturing relative humidity insensitive biasable transfer members, are those polyurethanes prepared by the reaction of polybutadiene polyol and a diisocyanate; the reaction of castor oil and 2,4-tolylene diisocyanate; the reaction of castor oil and the reaction product of a diisocyanate and polyalkylene ether glycol; the reaction product of a hydroxyl terminated butadiene-acrylonitrile copolymer and a diisocyanate; and the reaction product of a diisocyanate and the polyester of a dimer acid, A general formula for a diisocyanate is:

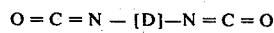

where D is a 36-carbon hydrocarbon radical. A typical diisocyanate prepared from linoleic acid in a Diels Alder-type reaction, the product of which is hydrogenated, would form the following typical diisocyanate formula:

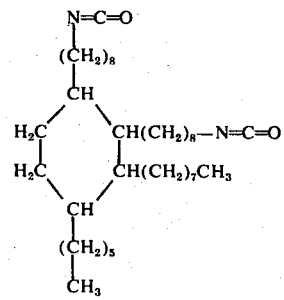

A polybutadiene resin reacts with the diisocyanate to provide a hydrophobic elastomeric polyurethane in accordance with the present invention. The polybutadiene is a polyol and capable of undergoing reaction with the diisocyanate. An example of the polybutadiene polyol resin is shown below wherein n equals 50 or 55, depending upon the grade of the material:

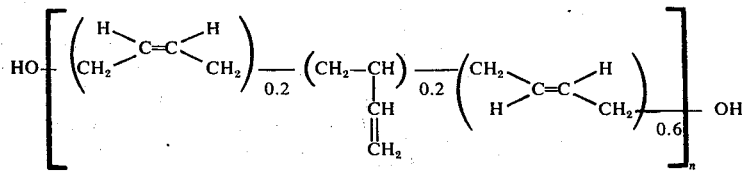

Another example of a hydrophobic elastomeric polyurethane which may be used to coat a biasable transfer member in acccordance with the present invention is based upon the reaction product of castor oil and tolylene diisocyanate. The castor oil reacts with the tolylene diisocyanate to form the precursor of the polyurethane and castor oil further reacts with the reaction product to form the polyurethane. An example of the reaction product of the castor oil and the tolylene diisocyanate, in simplified structure is shown below. The polymeric structure comprises additional units of the castor oil-tolylene diisocyanate precursor. The simplified structure for the precursor is:

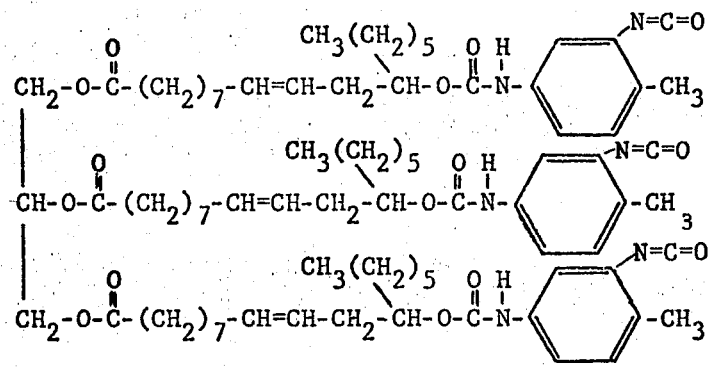

Other various examples of the hydrophobic elastomeric polyurethanes which may be used in accordance with the present invention include the polyurethane prepared by the reaction of castor oil and a polyether polyurethane which is the reaction product of diisocyanate and polyalkylene ether glycol, and the reaction products of diisocyanate and the polyesters of certain dimer acids. A dimer acid is a high molecular weight dibasic acid produced by dimerization of unsaturated fatty acids. The dimer characteristically contains 36 carbons.

Certain polyurethane copolymers may also be used in accordance with the present invention when the copolymer is characterized by the properties described supra. An example of a polyurethane copolymer which is a hydrophobic elastomeric polyurethane, is the reaction product of a copolymer of butadiene and acrylonitrile and a diisocyanate where the butadiene-acrylonitrile copolymer is hydroxy terminated. A formula for a typical butadiene-acrylonitrile copolymer is shown below:

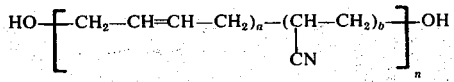

where $a$ is about 0.85; $b$ is about 0.15 and $n$ is about 78–87.

In accordance with the present invention certain additives may also be used which will not interfere with the relative humidity sensitivity or swing. These include certain plasticizers, anti-oxidants, ionic additives for controlling or reducing resistivity, and the like. Typical ionic additives for controlling the resistivity of the hydrophobic elastomeric polyurethane include quaternary ammonium compounds, an example of which is tetraheptyl ammonium bromide. Generally, the hydrophobic elastomeric polyurethanes with the lowest swings are the higher resistivity materials, consequently, the resistivities have to be reduced in order to be within the desired resistivity for the biasable transfer members. The tetraheptyl ammonium bromide ionic additive has been demonstrated as a suitable agent for the control of resistivity in the hydrophobic elastomeric polyurethane. The amount of additive generally required to reduce the resistivity of the higher resistivity hydrophobic elastomeric polyurethanes, is about 0.01 percent (by weight) to about 6.0 percent (by weight). However, the additive is unnecessary in those cases where the hydrophobic elastomeric polyurethane has a suitable resistivity for biasable transfer members, and the upper limit of the additive to control resistivity is limited only by the resistivity of the hydrophobic elastomeric polyurethane base material. Thus, quantities greater than 6.0 percent (by weight) can be used in preparing the biasable transfer members of the present invention. Generally, amounts of the resistivity control additive greater than 0.5 percent (by weight) are not required for achieving the desired resistivity.

As described supra, the hardness of the hydrophobic elastomeric polyurethanes of the present invention is between about 40 Shore 00 to about 40 Shore A, and preferably about 10–25 Shore A. The control of the hardness is within the purview of those skilled in the art, and the hardness can be controlled by such parameters as by varying the NCO/OH ratio, by varying the type of reactants utilized, and by using various additives such as plasticizers.

In accordance with the present invention, there is described the method of controlling the resistivity of a biasable transfer member to changes in relative humidity by coating a conductive substrate for supporting a uniform bias potential thereon with at least one layer of a hydrophobic elastomeric polyurethane having a resistivity of about $10^7$ to about $5.0 \times 10^{11}$ ohm cm, the relative humidity swing or sensitivity of the hydrophobic elastomeric polyurethane being from about 1 to about 12.0. The RH swing has been discussed above. The coating can be applied to the substrate by any suitable method or technique known in the art, including spraying, casting in molds, affixing sheets of the material to the substrate member by suitable mechanical means or by suitable cements, and the like.

The following specific examples illustrate more clearly hydrophobic elastomeric polyurethane materials which may be used in preparing the biasable transfer members and for controlling the resistivity of biasable transfer members when changes in relative humidity occur, although the invention is not to be construed as limited in its scope thereby.

SAMPLE PREPARATION

Slabs of the particular hydrophobic elastomeric polyurethane to be tested were cast in sheets having a thickness of about 0.125 inch. Samples of the various cast materials were placed in controlled humidity chambers for a designated number of days. One set of chambers was maintained at a relative humidity of 10 percent and another set of chambers were maintained at a relative humidity of 80 percent. The samples were suspended in the chambers in such a way that both sides were available to the atmosphere. In this manner the samples would have taken up very close to the equilibrium amounts of water within 14 days. Resistivities were measured by standard techniques, as by the AC bridge and relaxation techniques for determining resistivity. These standard methods are available to those skilled in the art. For example, in the relaxation technique for determining resistivity, the method consists of using a calibrated probe having a known beta and placing it on the bias roll or slab surface. A known potential is applied to the other side of the slab or surface and charge relaxation through the polyurethane is monitored by tracing the rise in probe potential. This is conveniently done by using a storage scope.

AC resistivity was measured at 1000 Hz using a General Radio Model 1615A capacitance bridge and a Type 1690A (Hartshorn type) dielectric sample holder. Samples were die-cut, 2-inch diameter discs. Tin foil electrodes were placed on the samples.

The resistivities measured at both 10 percent and 80 percent relative humidity were recorded, and the ratio of the resistivity at 10 percent relative humidity to the resistivity at 80 percent relative humidity was determined for each sample. The resulting ratio is designated as the RH sensitivity or RH swing and is reported as RH sensitivity in Table I below where resistivity at 10 percent and 80 percent relative humidities is also designated for the various samples tested.

EXAMPLES I AND II

Polyurethanes prepared from hydroxy terminated polybutadiene polyol (Arco polyol resin supplied by Arco Chemical Co.) and a diisocyanate (DDI 1420 supplied by General Mills) is shown in Table I, Example I. The polybutadiene polyol comprised about 80 percent of the product and the diisocyanate comprised about 20 percent (by weight). The ingredients were mixed in the presence of 1.2 percent (by weight) conventional catalysts at 100°C. The resistivities were measured as described above at the two designated relative humidities and the relative humidity sensitivity was determined after an equilibration time of 14 days in a relative humidity chamber. The relative humidity sensitivity was determined as being 1.7.

An additive, tetraheptyl ammonium bromide, was added to the product prepared in accordance with Example I, in quantities of 1 percent and 2 percent respectively to reduce the resistivity of the hydrophobic polyurethane elastomer.

EXAMPLES III AND IV

A hydrophobic elastomeric polyurethane was prepared from castor oil (DB oil supplied by Baker Castor Oil Co.) and 2,4-tolylene diisocyanate in a transesterification type reaction. The components were mixed while heated at 60°–65°C. The resistivities of the polyurethanes were measured and the RH sensitivity was determined. The equilibration time in days is also shown in Table I below. Hardness was 16 Shore A. Example IV was prepared in accordance with Example III except 1 percent and 2 percent respectively, of tetraheptyl ammonium bromide additive were used to control the resistivity of the polyurethane. The reduction in resistivity by use of the respective quantities of additive is shown in Table I below.

EXAMPLES V AND VI

A diisocyanate, DDI 1420 supplied by General Mills, and a polyester of dimer acid designated as 3390 by Emery Industries was used to prepare a polyurethane. The reaction was carried out in the presence of 0.05 percent conventional catalyst. Hardness was 16 Shore A for a 0.25 inch thick sample. The resistivity and the RH sensitivity are shown in Table I below. In Example VI a polyester of dimer acid having an alcohol portion which is more hydrophobic, that is which has less alcohol groups thereon, designated as Emery 1211, was reacted with a diisocyanate DDI 1420, supplied by General Mills. Hardness was 22 Shore A for a 0.25 inch thick sample. The resistivity at 10 percent and 80 percent relative humidity respectively is shown in Table I below as well as the ratio for the RH swing. When comparing Example V with Example VI, it is noted that the polyurethane having less polar alcohol portions (Example VI) has a better RH sensitivity than the polyurethane of Example V which has a higher polar alcohol content.

EXAMPLE VII

A slab of polyurethane was made by reacting 83.7 percent (by weight) butadiene-acrylonitrile copolymer, supplied by Arco Chemical Co., under the tradename Arco CN-15, with 16.2 percent diisocyanate, supplied by General Mills under the trade designation DDI 1410, in the presence of 0.1 percent conventional catalyst supplied by Argus Chemical under the trade designation Catalyst U1-19. The copolymer comprised about 85 percent (by weight) butadiene and about 15 percent (by weight) acrylonitrile. It had a hydroxyl value in meq./gm of 0.60 and a viscosity at 30°C of 525 poise. The hardness of the reaction product was 29 Shore A. The resistivities of two samples having 0.1 percent and 0.35 percent respectively, tetraheptyl ammonium bromide additive mixed therein both at 10 percent and 80 percent relative humidity are shown in Table I as well as the ratio for the RH sensitivity.

TABLE I

HUMIDITY SENSITIVITIES OF VARIOUS HYDROPHOBIC POLYURETHANE ELASTOMERS

| EXAMPLE | ELASTOMER | RESISTIVITY AT DESIGNATED RELATIVE HUMIDITY | | TIME (Days) | RH SENSITIVITY |
|---|---|---|---|---|---|
| | | 10% | 80% | | |
| I | Polybd - DDI | $3.1 \times 10^{14}$ | $1.8 \times 10^{14}$ | 14 | 1.7 |
| II | Polybd - DDI | | | | |
| | a. 1% Additive | $4.1 \times 10^{10}$ | $2.4 \times 10^{10}$ | 14 | 1.7 |
| | b. 2% Additive | $8.5 \times 10^{9}$ | $4.3 \times 10^{9}$ | | 1.8 |
| III | Castor Oil-TDI based polyurethane | $2.0 \times 10^{13}$ | $4.6 \times 10^{12}$ | 6 | 4.3 |
| IV | As III with | | | | |
| | a. 1% Additive | $3.1 \times 10^{10}$ | $9.4 \times 10^{9}$ | 14 | 3.3 |
| | b. 2% Additive | $1.1 \times 10^{10}$ | $2.7 \times 10^{9}$ | 14 | 4.1 |
| V | DDI-Emery 3390 | $3.8 \times 10^{12}$ | $6.0 \times 10^{11}$ | 15 | 6.3 |
| VI | DDI-Emery 1211 -134R | $4.4 \times 10^{14}$ | $7.7 \times 10^{13}$ | 14 | 5.7 |
| VII | Polybd-AN-DDI | | | | |
| | a. 0.1% Additive | $1.85 \times 10^{9}$ | $1.2 \times 10^{9}$ | 8 | 1.5 |
| | b. 0.35% Additive | $6.6 \times 10^{8}$ | $4.7 \times 10^{9}$ | 8 | 0.14 |

The objects of the present invention have been amply demonstrated by the above Examples. Biasable transfer members coated with the hydrophobic elastomeric polyurethanes are less sensitive to relative humidity changes than conventional polyurethanes. For example, the RH sensitivity of a conventional polyester based polyurethane taken on three different samples was 43, 40 and 38 respectively. Thus, by using the hydrophobic elastomeric polyurethanes of the present invention the relative humidity swing has been substantially reduced, and compositions and methods for making biasable transfer members wherein the resistivity of the biasable member is relatively independent of variations in relative humidity, have been demonstrated. Bias transfer rolls having a resilient elastomeric layer, the resistivity of which is substantially insensitive to relative humidity, have been demonstrated.

While this invention has been disclosed with reference to the structure and compositions disclosed herein, it is not necessarily confined to the details as set forth, and this application is intended to cover such modifications or changes as may come within the scope of the following claims.

What is claimed is:

1. A member for electrically cooperating with a photoconductive support surface to attract charged toner particles from the support surface towards the member comprising a conductive substrate for supporting a uniform bias potential thereon and at least one coating comprising a resilient, hydrophobic elastomeric polyurethane, the coating being in contact with the conductive substrate, and having an electrical resistivity such that the coating is capable of transmitting a bias potential from the substrate to the outer periphery of the coating, the electrical resistivity of the hydrophobic elastomeric polyurethane being substantially insensitive to changes in relative humidity.

2. The member of claim 1 further comprising an outer coating placed over the hydrophobic elastomeric polyurethane coating, the hydrophobic elastomeric polyurethane being resilient, whereby the hydrophobic elastomeric polyurethane coating forms a resilient blanket in contact with the substrate, said blanket having an electrical resistivity capable of transmitting a bias potential from the substrate to the outer periphery of the blanket.

3. The member of claim 2 wherein the outer coating is formed of an elastomeric material having a resistivity of between $10^{10}$ and $10^{15}$ ohm cm.

4. The member of claim 1 wherein the hydrophobic elastomeric polyurethane has a resistivity of between about $10^{7}$ and $5.0 \times 10^{11}$ ohm cm.

5. The member of claim 1 wherein the hydrophobic elastomeric polyurethane has a hardness between about 40 Shore 00 to about 40 Shore A.

6. The member of claim 1 wherein the conductive substrate having a coating of hydrophobic elastomeric polyurethane is formed on a conductive metal in the shape of an endless belt.

7. The member of claim 1 wherein the coating comprising a hydrophobic elastomeric polyurethane further comprises an additive to provide a resistivity of between about $10^{7}$ and about $5 \times 10^{11}$ ohm cm.

8. The member of claim 7 wherein the additive is a quaternary ammonium compound.

9. The member of claim 1 wherein the hydrophobic elastomeric polyurethane is prepared by the reaction of polybutadiene polyol and a diisocyanate.

10. The member of claim 1 wherein the hydrophobic elastomeric polyurethane is the reaction product of castor oil and 2,4-tolylene diisocyanate.

11. The member of claim 1 wherein the hydrophobic elastomeric polyurethane is prepared by the reaction of castor oil and the reaction product of a diisocyanate and polyalkylene ether glycol.

12. The member of claim 1 wherein the hydrophobic elastomeric polyurethane is the reaction product of a diisocyanate and the hydroxy terminated polyester of a dimer acid.

13. The member of claim 1 wherein the hydrophobic elastomeric polyurethane is the reaction product of a diisocyanate and a hydroxy-terminated butadiene-acrylonitrile copolymer.

14. A method of controlling the sensitivity of resistivity of a member for electrically cooperating with a photoconductive support surface to attract charged toner particles from the support surface towards the member, to changes in relative humidity comprising coating a conductive substrate for supporting a uniform bias potential thereon with at least one layer of a resilient, hydrophobic elastomeric polyurethane having an electrical resistivity of about $10^7$ to about $5 \times 10^{11}$ ohm-cm, such that said coating is capable of transmitting a bias potential from the substrate to the outer periphery of the coating.

15. A method in accordance with claim 14 further comprising coating the hydrophobic elastomeric polyurethane with an outer coating whereby the hydrophobic elastomeric polyurethane forms a resilient blanket in contact with the substrate, said blanket having an electrical resistivity capable of transmitting the bias potential on the substrate to the outer periphery of the blanket.

16. A transfer roll for electrically cooperating with a photoconductive plate when brought into contact therewith to attract charged toner particles from the plate toward the roll comprising an electrically conductive core material having at least one coating of a resilient hydrophobic elastomeric polyurethane, said hydrophobic polyurethane being relatively insensitive to changes in relative humidity and having an electrical resistivity such that the coating is capable of transmitting a bias potential from the substrate to the outer periphery of the coating.

17. The transfer roll of claim 16 further comprising an outer resilient coating placed over the hydrophobic elastomeric polyurethane coating, the coating having a resistivity to minimize ionization of the surrounding atmosphere in and about the zone of contact between the transfer roll and the photoconductive plate.

18. The transfer roll of claim 17 wherein the resilient hydrophobic elastomeric polyurethane intermediate the conductive core and the outer resilient coating has a resistivity of between about $10^9$ and $10^{10}$ ohm cm.

19. The transfer roll of claim 16 wherein the hydrophobic elastomeric polyurethane coating material further comprises an additive to provide a resistivity of between about $10^7$ and about $5 \times 10^{11}$ ohm cm.

20. The transfer roll of claim 19 wherein the additive is a quaternary ammonium compound.

21. The transfer roll of claim 16 wherein the hydrophobic elastomeric polyurethane is the reaction product of polybutadiene polyol and a diisocyanate.

22. The transfer roll of claim 16 wherein the hydrophobic elastomeric polyurethane is prepared by the reaction of castor oil and 2,4-tolylene diisocyanate.

23. The transfer roll of claim 16 wherein the hydrophobic elastomeric polyurethane is prepared by the reaction of castor oil and the reaction product of a diisocyanate and a polyalkylene ether glycol.

24. The transfer roll of claim 16 wherein the hydrophobic elastomeric polyurethane is prepared by the reaction of a diisocyanate and the hydroxy terminated polyester of a dimer acid.

25. The transfer roll of claim 16 wherein the hydrophobic elastomeric polyurethane is the reaction product of a diisocyanate and a hydroxy-terminated butadiene-acrylonitrile copolymer.

26. A method of controlling the resistivity of a roll for electrically cooperating with a photoconductive plate to attract charged toner particles from the plate towards the member when brought into contact therewith, with changes in relative humidity, comprising, applying at least one coating of a resilient, hydrophobic elastomeric polyurethane to an electrically conductive core material which supports a uniform bias potential thereon, said hydrophobic elastomeric polyurethane having an electrical resistivity such that the coating is capable of transmitting a bias potential from the core to the outer periphery of the coating.

27. The method in accordance with claim 26 further comprising applying a hydrophobic elastomeric polyurethane with an outer coating over the conductive core whereby the hydrophobic elastomeric polyurethane forms a resilient blanket having an electrical resistivity such that the blanket is capable of transmitting the bias potential from the conductive core to the outer pheriphery of the blanket.

* * * * *